UNITED STATES PATENT OFFICE.

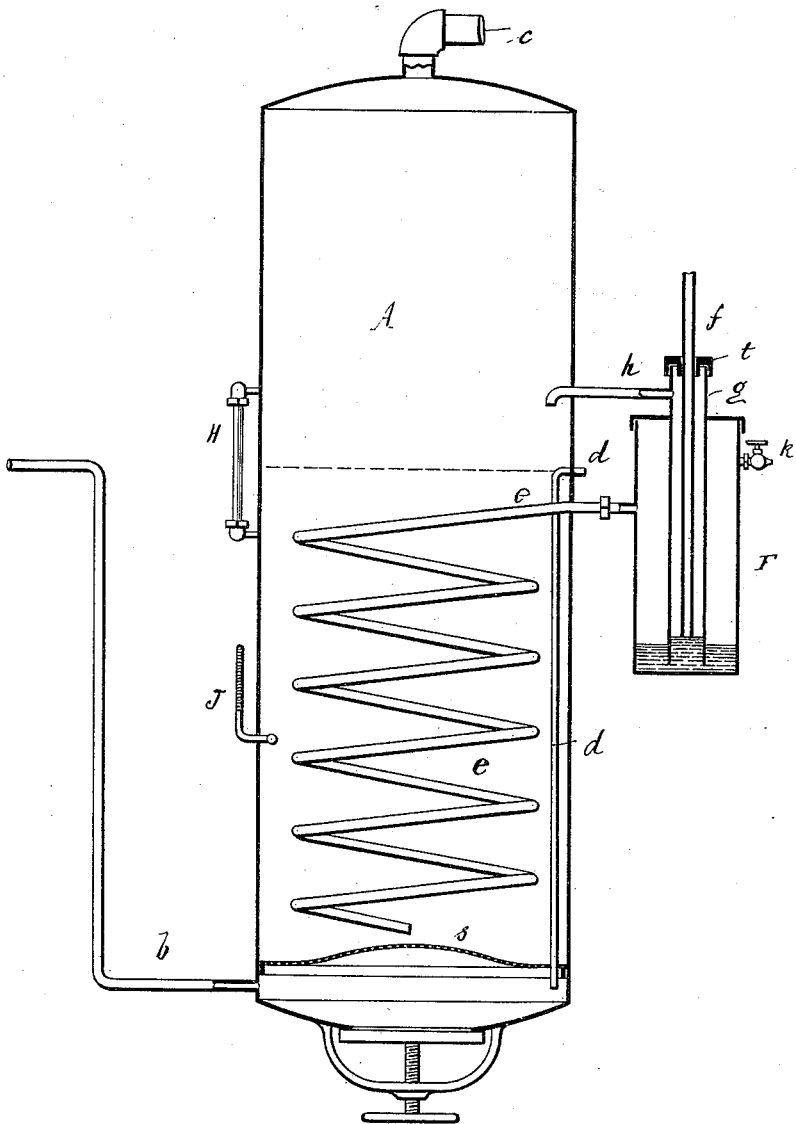

GUSTAV SOBOTKA, OF NEW YORK, N. Y., ASSIGNOR TO FLEISCHMANN & COMPANY, OF SAME PLACE.

APPARATUS FOR PURIFYING AIR.

SPECIFICATION forming part of Letters Patent No. 443,300, dated December 23, 1890.

Application filed October 17, 1890. Serial No. 368,469. (No model.)

*To all whom it may concern:*

Be it known that I, GUSTAV SOBOTKA, a citizen of Austria-Hungary, and a resident of the city of New York, in the county of New York and State of New York, have invented certain new and useful Improvements in an Apparatus for Purifying Air and Regulating its Temperature, of which the following is a specification.

The object of my invention is to provide a new and improved apparatus for purifying air and regulating its temperature.

The invention consists in the combination, with a closed water-tank, of means for conducting air through the water in the tank and means for automatically controlling a supply of warm water to the tank.

The invention also consists in the construction and combination of parts and details, which will be fully described hereinafter, and finally pointed out in the claims.

In the accompanying drawing a vertical transverse sectional view of my improved apparatus for purifying air and regulating its temperature is shown.

The closed cylindrical tank A is partly filled with water, as indicated in the dotted line, through which water the air entering the bottom of the vessel A through the pipe $b$ and leaving at the top from the pipe $c$ has to pass. A fine screen $s$ is arranged near the bottom of the tank A for the purpose of separating the air as much as possible and forming minute air-bubbles, which, by coming in contact with the water throw off their impurities to the water and pass out of the tank A in a purified condition. A suction-pump or like device is to be connected with the pipe $c$ for drawing the air through the apparatus. In its passage through the water the air attains nearly the same temperature as the water, and thus for the purpose of regulating the temperature of the air it is necessary to regulate the temperature of the water, and this is accomplished automatically by the following device: A spiral or serpentine metallic tube $e$, closed at the lower end, is arranged in the tank A, the lower closed end of said serpentine tube being near the bottom of the tank. The upper open end of said tube $e$ is in communication with the cylinder F, arranged at the side of the tank A. Through the top head of said cylinder F two pipes $f$ and $g$ pass, the pipe $g$ surrounding the pipe $f$. The lower end of the pipe $g$ is within a short distance from the bottom of the cylinder F, and is provided at its top with a stuffing-box $t$, through which the pipe $f$ passes, the lower end of the pipe $f$ being a short distance above the lower end of the pipe $g$. Said pipe $f$ is capable of being adjusted and can be raised more or less, as may be required. A branch pipe $h$ extends from the pipe $g$ and is in communication with the cylinder or tank A. A try-cock $k$ is arranged near the top of the cylinder F. The try-cock $k$ is opened and the cylinder F is filled to about one-sixth of its height with mercury, the air escaping through the try-cock $k$. The pipe $f$, which is connected with the warm-water supply, is raised until its lower end is above the level of the mercury in the lower end of the pipe $g$, thus permitting the warm water to pass through the lower end of the pipe $f$ into the pipe $g$, in which it rises, and then passes through the pipe $h$ into the tank A. When the desired temperature in the tank A is obtained, the try-cock $k$ is closed and the device now works automatically.

If the temperature of the water rises, the air in the spiral or serpentine tube $e$ expands and by its pressure raises the level of the mercury in the bottom part of the cylinder F sufficiently to cause said mercury to close the lower end of the pipe $f$ more or less, whereby the stream of warm water passing into the apparatus is decreased or even shut off entirely.

If the temperature in the tank A decreases and is below the degree for which the apparatus is adjusted, the air in the serpentine pipe $e$ contracts, the pressure on the mercury is removed, and the column of mercury in the lower end of the pipe $g$ descends, thus opening the pipe $f$ to a greater extent and permitting the warm water to flow in the tank A.

$d$ is the outlet-pipe for the water in the tank A.

To facilitate controlling the apparatus, the cylinder or tank A is provided with a gaged glass H and the thermometer J.

Having thus described my invention, I claim as new and desire to secure by Letters Patent—

1. In an apparatus for purifying air and regulating its temperature, the combination, with a tank, of means for conducting the air through the tank, a pipe for conducting hot water into the tank, and an automatic device for controlling the flow of water into the tank by the temperature of the air in said tank, substantially as set forth.

2. In an apparatus for purifying air and regulating its temperature, the combination, with a tank, of means for conducting the air through said tank, a coiled pipe closed at one end and located in said tank, an inlet-pipe for conducting water into the tank, and a mercury seal controlling said inlet-pipe, which mercury seal is in communication with the said coiled pipe in the tank, substantially as set forth.

3. In an apparatus for purifying air and regulating its temperature, the combination, with a tank, of means for conducting the air through said tank, a coiled pipe arranged in said tank, a vessel outside of the tank connected with said coiled pipe, a mercury seal formed in the bottom of said vessel, and a feed-pipe for the tank extending to the bottom of said vessel and adapted to be opened or closed by the mercury seal, substantially as set forth.

4. In an apparatus for purifying air and regulating its temperature, the combination, with a tank, of means for conducting the air through said tank, a coiled pipe in said tank, a closed vessel with which one end of said coiled pipe is connected, a mercury seal formed in the bottom of said vessel, a feed-pipe projecting into the vessel and adapted to be closed at its lower end by the mercury seal, a pipe surrounding said feed-pipe, and a branch pipe extending from said outer pipe to the tank, substantially as set forth.

In testimony that I claim the foregoing as my invention I have signed my name in presence of two subscribing witnesses.

GUSTAV SOBOTKA.

Witnesses:
OSCAR F. GUNZ,
W. REIMHERR.